(12) United States Patent
Donnay et al.

(10) Patent No.: US 8,182,639 B2
(45) Date of Patent: May 22, 2012

(54) WEIGHT APPLICATOR FOR A WHEEL AND METHOD FOR UTILIZING THE SAME

(75) Inventors: John Donnay, Fenton, MI (US); Dale Terry, White Lake, MI (US)

(73) Assignee: Android Industries LLC, Auburn Hills, MI (US)

( * ) Notice: Subject to any disclaimer, the term of this patent is extended or adjusted under 35 U.S.C. 154(b) by 208 days.

(21) Appl. No.: 12/635,445

(22) Filed: Dec. 10, 2009

(65) Prior Publication Data

US 2010/0147458 A1 Jun. 17, 2010

Related U.S. Application Data

(60) Provisional application No. 61/121,929, filed on Dec. 12, 2008.

(51) Int. Cl.
*B29C 65/48* (2006.01)
*B29C 65/52* (2006.01)
*B32B 37/00* (2006.01)
*B32B 38/00* (2006.01)
*B23P 19/00* (2006.01)

(52) U.S. Cl. ...... 156/281; 156/289; 156/307.3; 156/307.5; 156/358; 156/538; 156/556; 156/579; 156/583.1; 29/802; 301/5.21

(58) Field of Classification Search .......... 156/281, 156/289, 307.1, 307.3, 307.5, 307.7, 358, 156/538, 556, 579, 580, 581, 583.1; 29/802; 100/269.01, 269.02, 269.03; 73/66; 301/5.21
See application file for complete search history.

(56) References Cited

U.S. PATENT DOCUMENTS

| 427,415 | A | | 5/1890 | Griffin |
| 1,130,210 | A | | 3/1915 | Spence |
| 1,667,344 | A | | 4/1928 | Couture |
| 5,073,422 | A | * | 12/1991 | Konno et al. ............... 428/40.7 |
| 7,478,659 | B2 | * | 1/2009 | Jeon ............................... 156/358 |
| 2007/0144681 | A1 | | 6/2007 | Cunningham |

FOREIGN PATENT DOCUMENTS

| JP | 2007107709 A | | 4/2007 |
| JP | 2008051140 A | | 3/2008 |
| KR | 100659493 B1 | | 12/2006 |
| KR | 100783928 B1 | | 12/2007 |
| KR | 100867303 B1 | | 11/2008 |
| WO | WO 2009012104 A1 | * | 1/2009 |

OTHER PUBLICATIONS

Machine English translation of KR 10-0659493 (Dec. 20, 2006).*
Machine English Translation of KR 10-0783928 (Dec. 10, 2007).*
Machine English Translation of KR 10-2006-0022512 (Mar. 10, 2006).*

* cited by examiner

*Primary Examiner* — Sing P Chan
(74) *Attorney, Agent, or Firm* — Honigman Miller Schwartz and Cohn LLP

(57) ABSTRACT

A weight applicator for a wheel of a tire-wheel assembly is disclosed. The weight applicator includes an arm portion and an applicator portion connected to the arm portion. The applicator includes a radially-extending flange portion. The radially-extending flange portion is connected to the arm portion. A first plunger portion is movably-connected to the radially-extending flange portion by one of more first radial arms. A method is also disclosed.

22 Claims, 15 Drawing Sheets

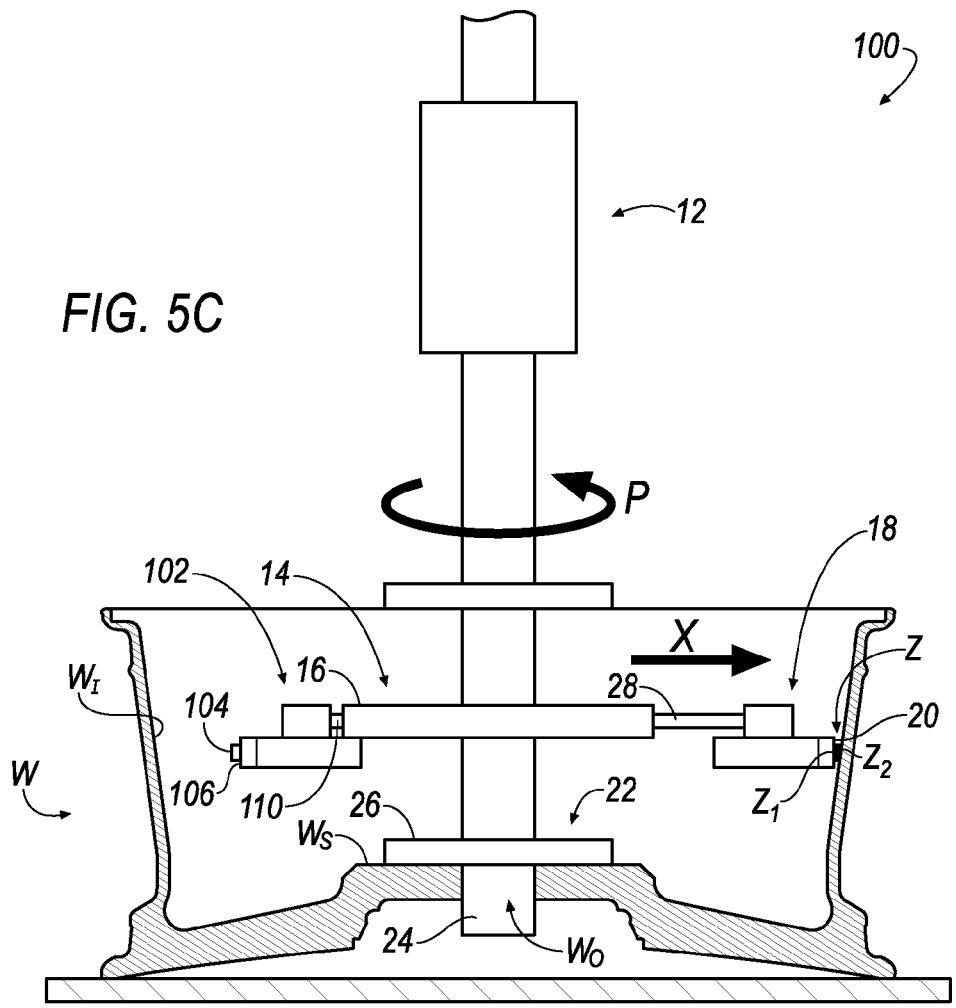

WEIGHT APPLICATOR FOR A WHEEL AND METHOD FOR UTILIZING THE SAME

RELATED APPLICATION

This disclosure claims the benefit of U.S. provisional patent application Ser. No. 61/121,929 filed on Dec. 12, 2008.

FIELD OF THE INVENTION

The disclosure relates to a wheel of a tire-wheel assembly and to a method and apparatus for processing at least a wheel of a tire-wheel assembly.

DESCRIPTION OF THE RELATED ART

It is known in the art that a tire-wheel assembly is processed in several steps. Usually, conventional methodologies that conduct such steps require a significant capital investment and human oversight. The present invention overcomes drawbacks associated with the prior art by setting forth a device utilized for processing at least a wheel of a tire-wheel assembly.

BRIEF DESCRIPTION OF THE DRAWINGS

The disclosure will now be described, by way of example, with reference to the accompanying drawings, in which:

FIGS. 5A-5D illustrate a side, cross-sectional view of a wheel and a side view of the weight applicator of FIG. 4 in accordance with an exemplary embodiment of the invention;

FIGS. 6A-6D illustrate a top view of the wheel and weight applicator of FIGS. 5A-5D in accordance with an exemplary embodiment of the invention;

DETAILED DESCRIPTION OF THE INVENTION

The Figures illustrate an exemplary embodiment of a weight applicator for a wheel and method for using the same in accordance with an embodiment of the invention. Based on the foregoing, it is to be generally understood that the nomenclature used herein is simply for convenience and the terms used to describe the invention should be given the broadest meaning by one of ordinary skill in the art.

Figure 1:
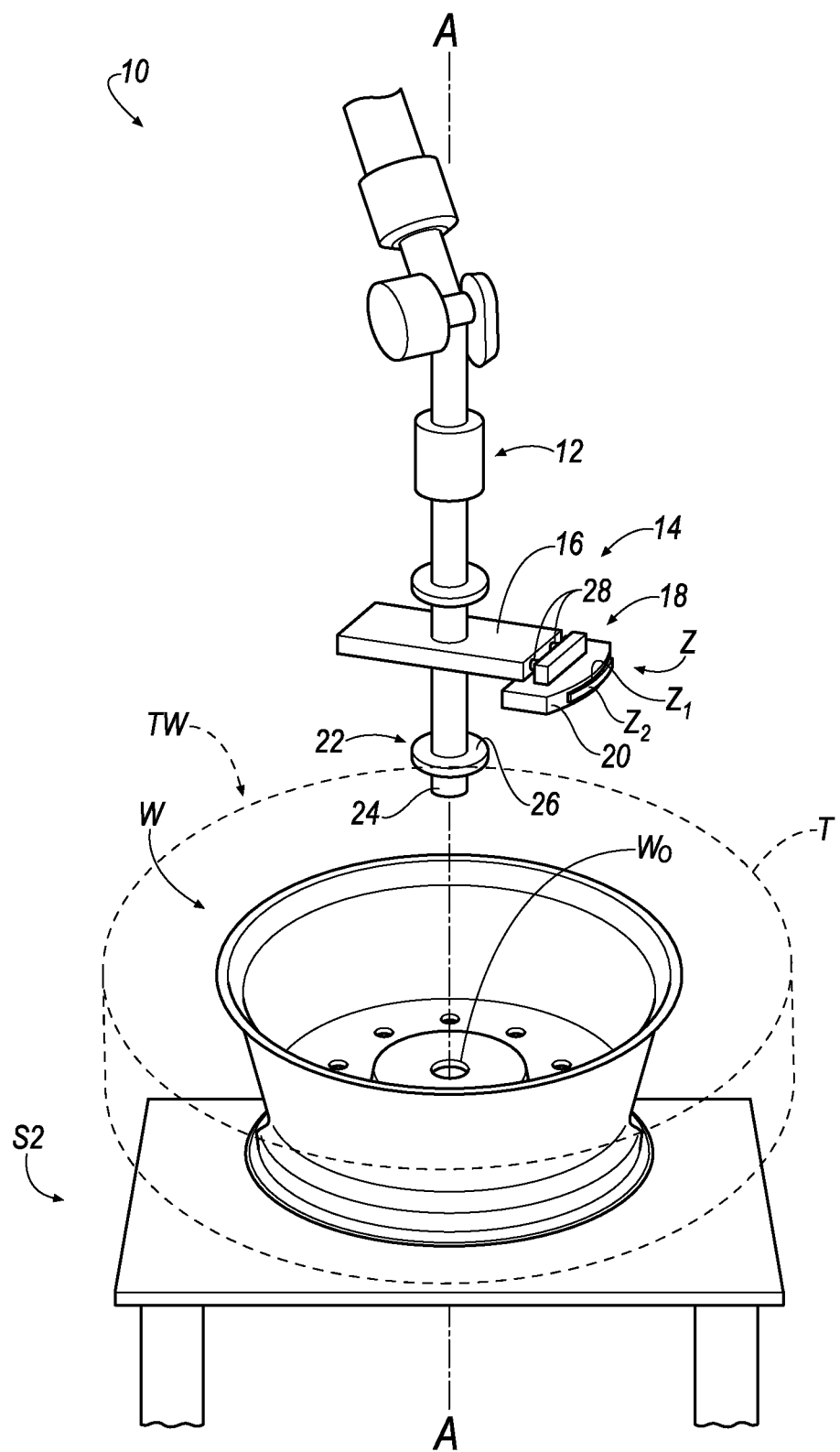
FIG. 1 illustrates a perspective view of a weight applicator for a wheel in accordance with an exemplary embodiment of the invention.

Referring to FIG. 1, a wheel, W, and a weight applicator 10 is shown in accordance with an embodiment of the invention. In an embodiment, the wheel, W, and weight applicator 10 are axially aligned with an axis, A-A. In an embodiment, the axis, A-A, is generally co-axial with an arm 12 of the weight applicator 10. Further, in an embodiment, the axis, A-A, extends through a central, axial opening, $W_O$, defined by the wheel, W.

Figure 10:
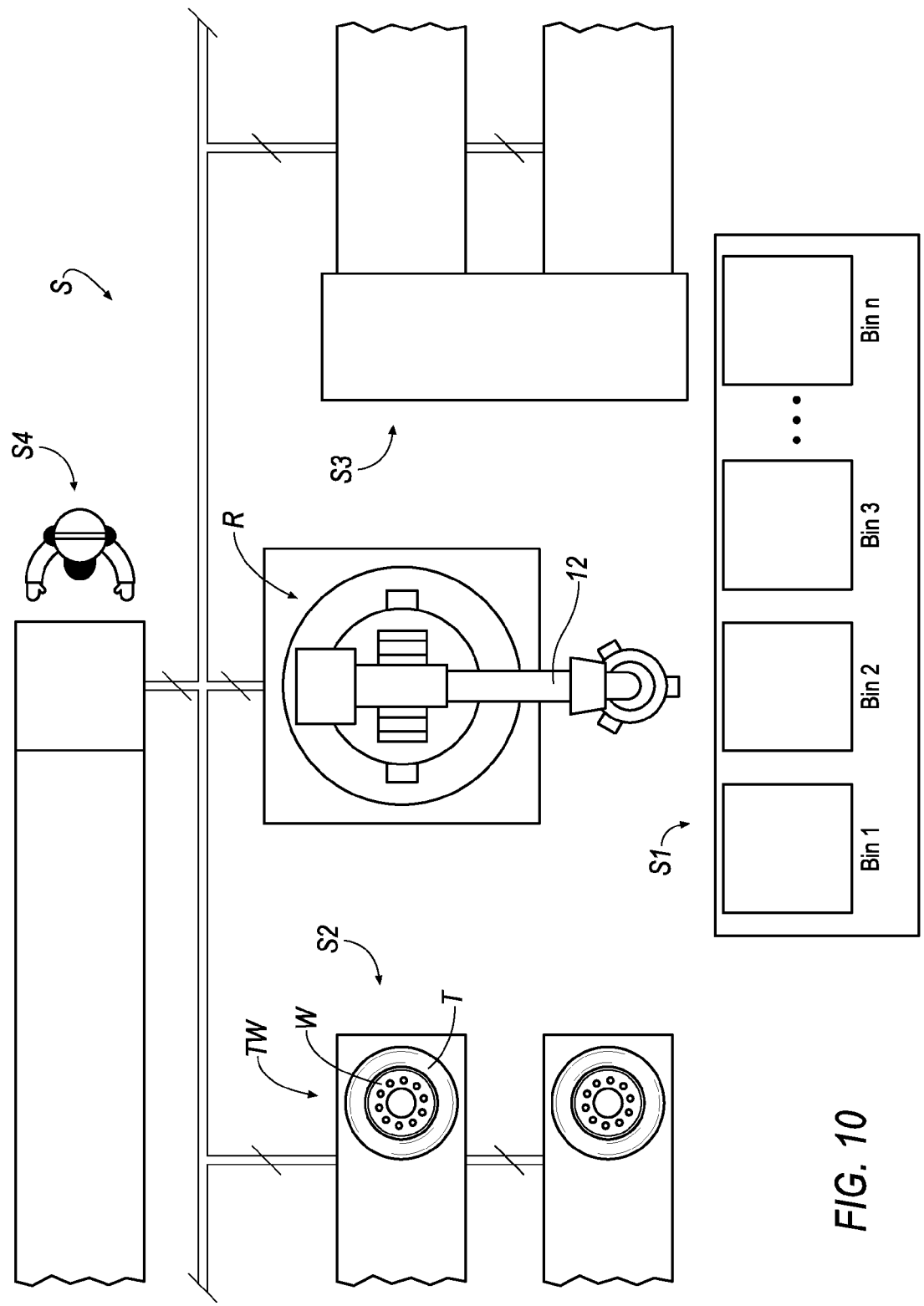
FIG. 10 illustrates an apparatus for processing a tire-wheel assembly in accordance with an exemplary embodiment of the invention.

In an embodiment, the arm 12 may extend from and be connected to a robotic device, R (see, e.g., FIG. 10). In an embodiment, the robotic device, R, may be automated such that the robotic device, R, may manipulate one or more of the wheel, W, and a tire, T, connected to the wheel, W, in order to join the tire, T, and wheel, W, for assembling a tire-wheel assembly, TW.

Further, in an embodiment, the robotic device, R, may be centrally positioned among a plurality of sub-stations to define a single-cell workstation. In an embodiment, each sub-station may be dedicated to a particular function during the processing/assembly of the tire-wheel assembly, TW. In an embodiment, each sub-station may perform a dedicated task, such as, for example, the lubricating/soaping of a wheel, W, the mounting of a tire, T, to a wheel, W, the balancing of a tire, T, and the wheel, W, and the inflation of the tire, T, that is mounted to the wheel, W.

In an embodiment, as seen in FIG. 10, a single-cell workstation, S, may include a plurality of sub-stations, S1-S4, that are each dedicated to the stowing/retrieval of one or more weights at sub-station, S1, the application of one or more weights at sub-station, S2, the audit balancing of the tire-wheel assembly (that includes an applied weight) at sub-station, S3, and the re-working of the audited tire-wheel assembly, TW, at sub-station, S4 (if, e.g., the tire-wheel assembly, TW, remains un-balanced after an application of one or more weights). Functionally, in an embodiment, the arm 12 may retrieve one or more unique weights from one or more bins of a plurality of bins at sub-station, S1. Then, the arm 12 moves from sub-station, S1, to sub-station, S2, in order to apply the retrieved weight to the wheel, W. Later, the arm 12 moves the weight-applied tire-wheel assembly, TW, to sub-station, S3, to audit the balancing of the weight-applied tire-wheel assembly, TW, and, if the tire-wheel assembly, TW, remains un-balanced, the arm 12 moves the weight-applied tire-wheel assembly to sub-station, S4, for re-working/investigation.

It will be appreciated that the robotic device, R, may be programmed with, or, receives instructions regarding which bin to interface with at sub-station, S1, in order to retrieve a desired style/type of weight to be applied to the wheel, W. Further, it will be appreciated that the robotic device, R, may be programmed with or receives instructions at sub-station, S2, regarding a particular location on the wheel, W, where the retrieved one or more weights should be placed.

Referring to FIG. 1, it will be appreciated that, in an embodiment, the wheel, W, may be located at, for example, the sub-station, S2; as such, in an embodiment, the wheel, W, is shown without the tire, T, joined thereto. However, it will be appreciated that the foregoing discussion of the weight applicator 10 is not limited to an arm 12 extending from a robotic device, R, and, further, it will be appreciated that the wheel, W, is not necessarily located at a sub-station, S2, of a plurality of sub-stations, S1-S4, of a single-cell workstation, S. In an embodiment, it will be appreciated that the arm 12 is not limited to extending from a robotic device, R, and, further, it will be appreciated that the weight applicator 10 is not limited to conducting work upon a wheel, W, located at a sub-station, S2, of a single-cell workstation, S.

In an embodiment, as seen at FIG. 1, an applicator portion 14 is attached to and extends radially away from the arm 12. In an embodiment, the applicator portion 14 includes a radial flange portion 16 and a radial plunger portion 18. In an embodiment, the flange portion 16 is radially-fixed to the arm 12. In an embodiment, the plunger portion 18 is movably-connected to the flange portion 16 in a radial direction.

In an embodiment, the plunger portion 18 includes an outer, arcuate surface 20. In an embodiment, a wheel weight, Z, is removably-attached to the outer, arcuate surface 20.

In an embodiment, the wheel weight, Z, includes a first surface, $Z_1$, and a second surface, $Z_2$. In an embodiment, each of the first and second surfaces, $Z_1$, $Z_2$, include an adhesive.

In an embodiment, the first surface, $Z_1$, of the weight, Z, is removably-attached to the outer arcuate surface 20 with the adhesive. As described in the foregoing disclosure, the second surface, $Z_2$, of the weight, Z, is affixed to the wheel, W, with the adhesive (see, e.g., FIGS. 2C, 3C) by the plunger portion 18.

Figure 2A:
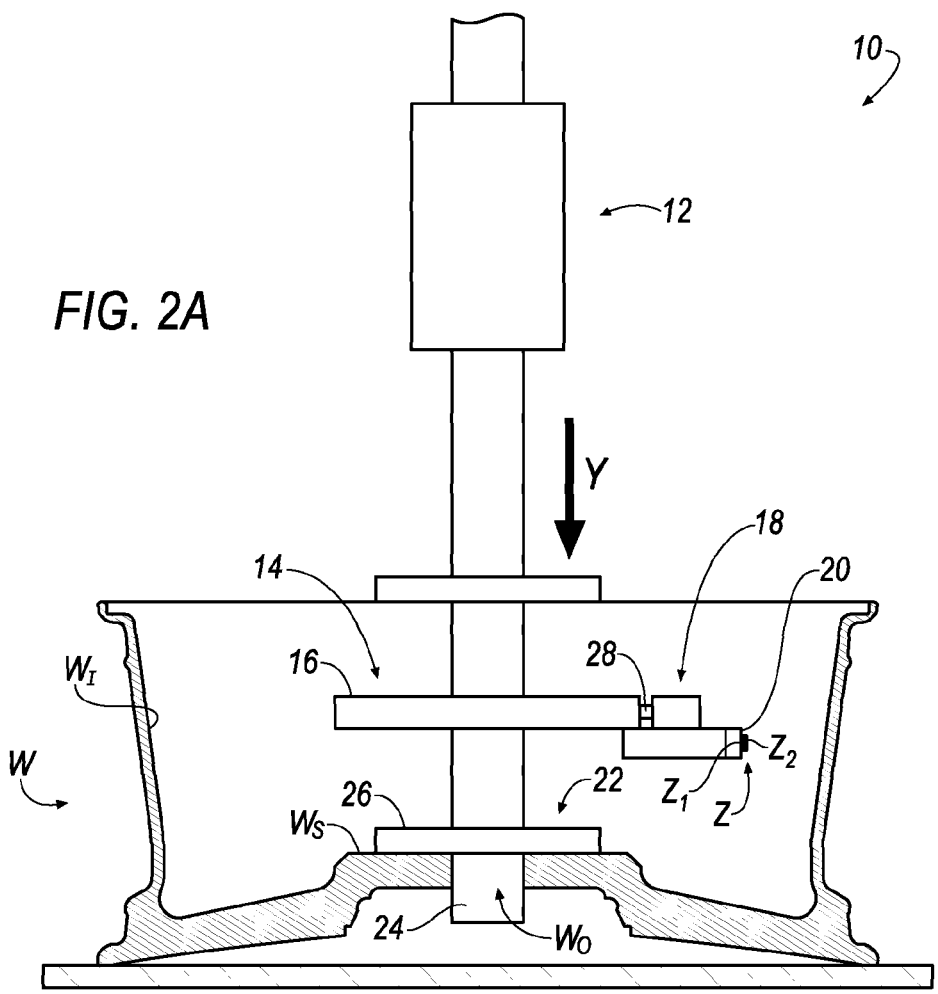
FIGS. 2A-2C illustrate a side, cross-sectional view of a wheel and a side view of the weight applicator of FIG. 1 in accordance with an exemplary embodiment of the invention.
Figure 3A:
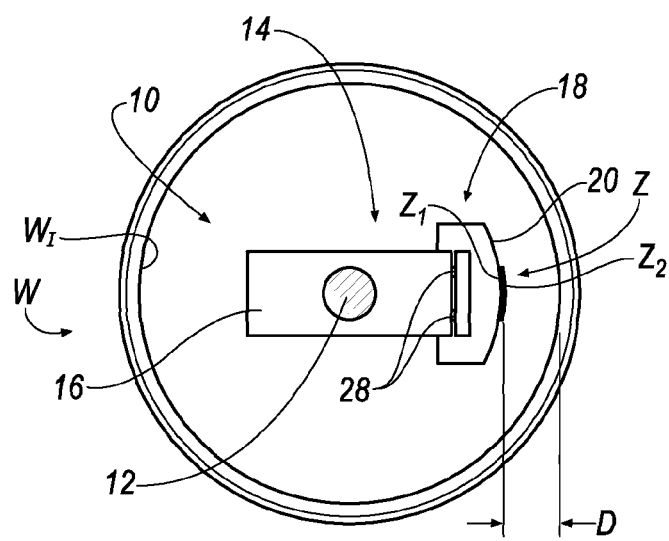
FIGS. 3A-3C illustrate a top view of the wheel and weight applicator of FIGS. 2A-2C in accordance with an exemplary embodiment of the invention.

Referring to FIGS. 2A and 3A, the arm 12 is moved according to the direction of the arrow, Y, for interfacing the arm 12 with the wheel, W. In an embodiment, the arm 12 is interfaced with/removably-connected to the wheel, W, by an interfacing portion 22.

In an embodiment, the interfacing portion 22 includes an axial portion 24 extending axially from the arm 12 and a radial portion 26 extending radially from the arm 12. In an embodiment, the axial portion 24 is designed to be inserted into and through the central, axial opening, $W_O$, of the wheel, W. In an embodiment, the radial portion 26 is designed to be disposed adjacent a hub surface, $W_S$, of the wheel, W.

Figure 2B:
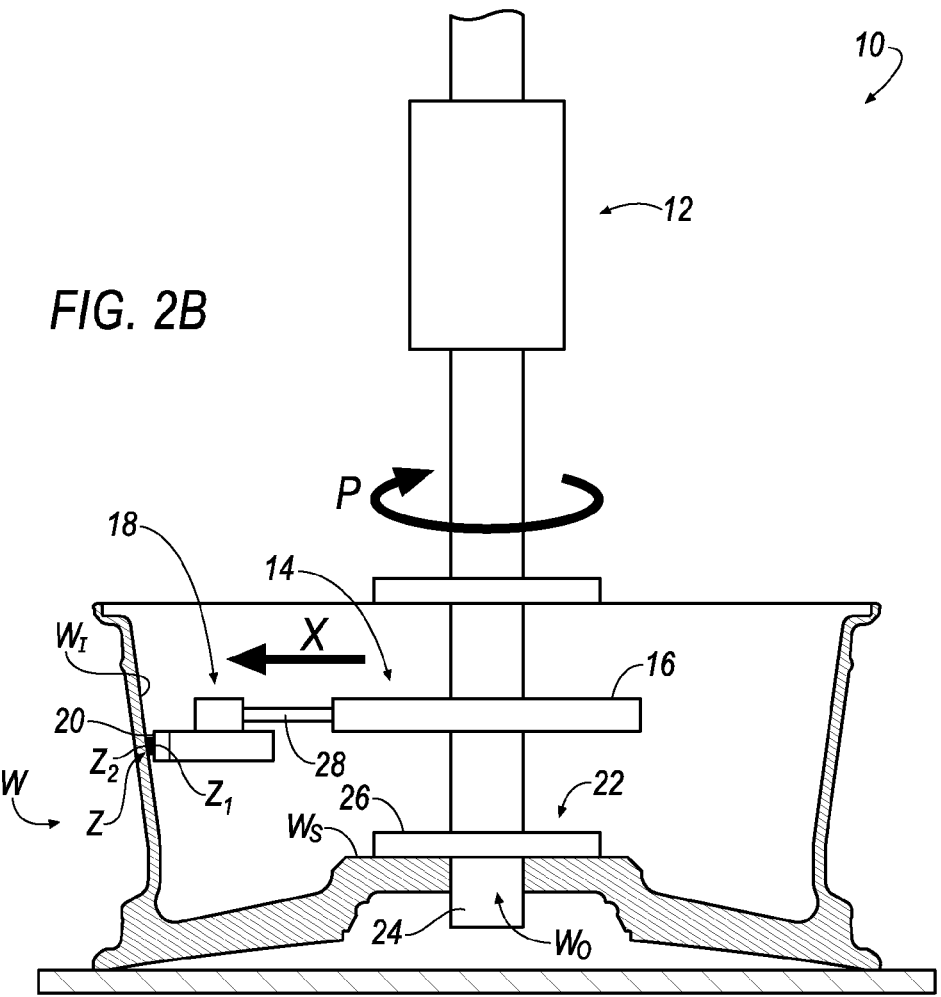
Figure 3B:
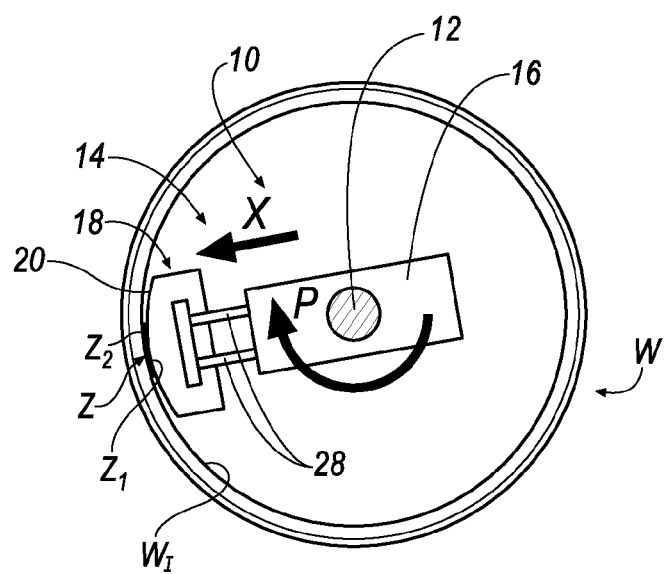

Referring to FIGS. 2B and 3B, once the interfacing portion 22 connects the weight applicator 10 to the wheel, W, the arm 12 is rotated/pivoted according to the direction of the arrow, P. As shown in the illustrated embodiment, the arm 12 is pivoted approximately 170°. In an embodiment, the pivoting movement, P, of the arm 12 may be automatically or manually conducted. In an embodiment, the pivoting movement, P, permits the weight applicator 10 to be adjusted such that the plunger portion 18 may be arranged in an opposing relationship with a portion of an inner surface, $W_I$, of the wheel, W, where it is desired to locate the weight, Z. The location of the weight, Z, upon the inner surface, $W_I$, of the wheel, W, may be discovered/determined in an earlier balancing operation.

Once pivoted according to the direction of the arrow, P, the plunger portion 18 is moved radially-outwardly and away from the flange portion 16 according to the direction of the arrow, X. In an embodiment, one or more arms 28, which may be, for example, hydraulically-actuated, may radially move the plunger portion 18 away from the flange portion 16.

In an embodiment, the one or more arms 28 radially extend the plunger portion 18 away from the flange portion 16 according to the direction of the arrow, X, at a distance, D (see, e.g., FIG. 3A). The distance, D, is sufficient to locate the second surface, $Z_2$, of the weight, Z, adjacent an inner surface, $W_I$, of the wheel, W, for affixing the weight, Z, to the wheel, W, by way of the adhesive applied to the second surface, $Z_2$, of the weight, Z.

In an embodiment, it will be appreciated that the weight, Z, may include an arcuate shape that is substantially similar to the arcuate outer surface 20 of the plunger portion 18. In an embodiment, the arcuate shape of the weight, Z, and the arcuate outer surface 20 of the plunger portion 18 permits the plunger portion 18 to dispose the weight, Z, substantially adjacent the inner surface, $W_I$, of the wheel, W.

Figure 2C:
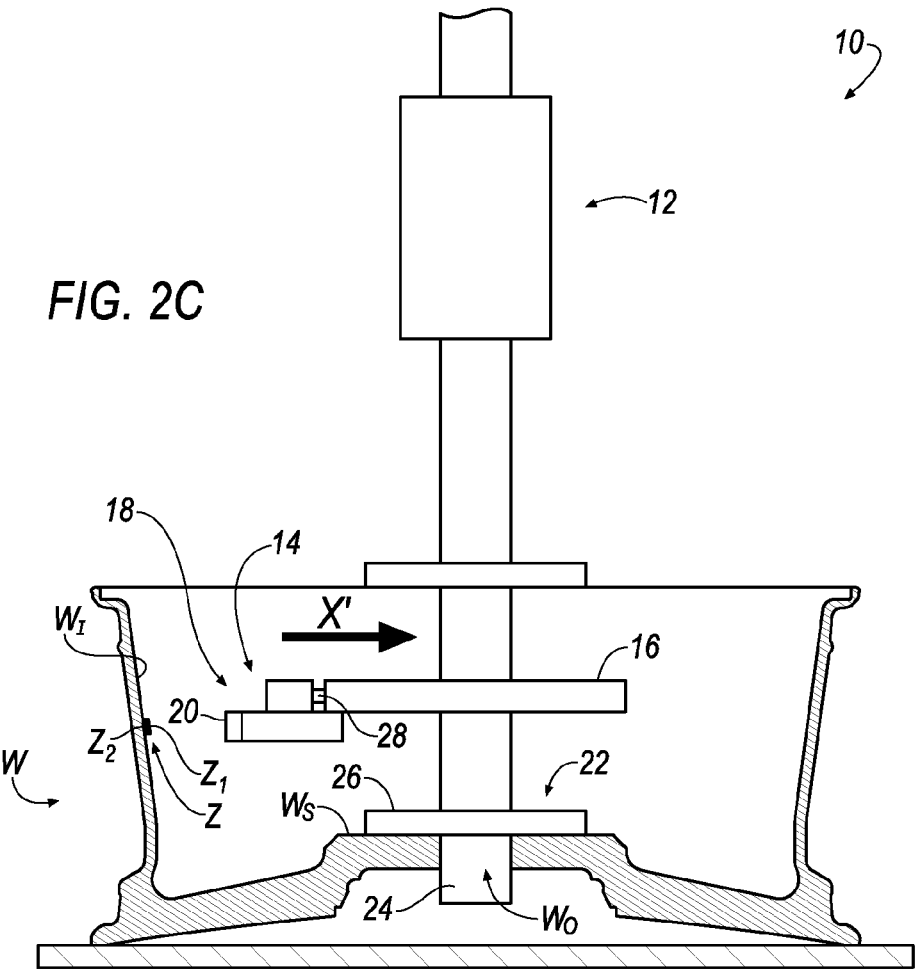
Figure 3C:
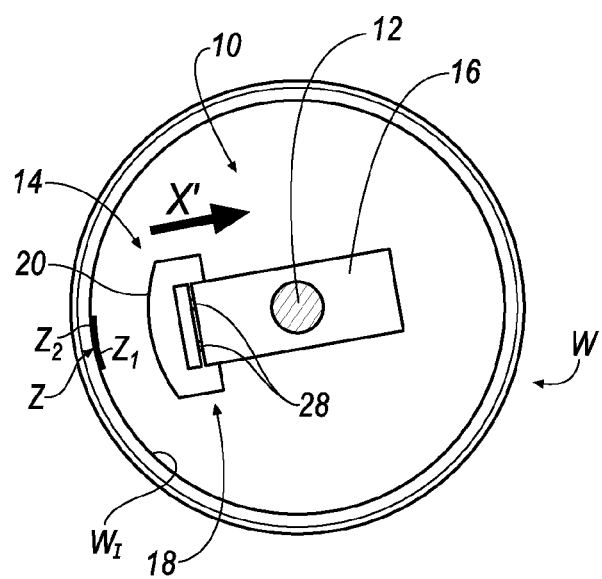

Referring to FIGS. 2C and 3C, the weight, Z, is shown affixed to the inner surface, $W_I$, of the wheel, W. Once affixed to the inner surface, $W_I$, of the wheel, W, the one or more arms 28 may radially withdraw the plunger portion 18 away from the inner surface, $W_I$, of the wheel, W, according to the direction of arrow, X', which is substantially opposite the direction of the arrow, X, such that the first surface, $Z_1$, of the weight, Z, is detached from the outer arcuate surface 20 of the plunger portion 18.

Figure 4:
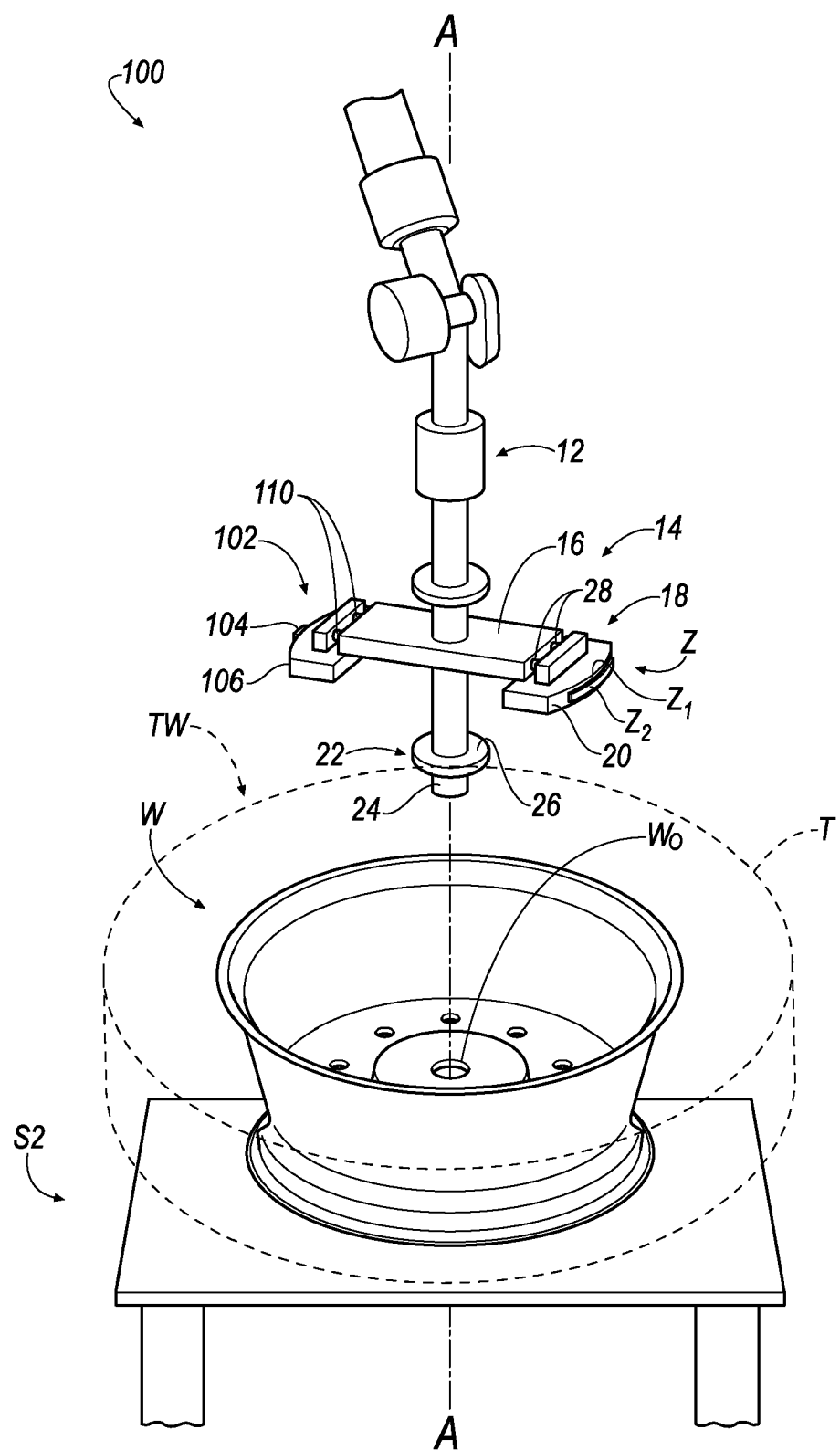
FIG. 4 illustrates a perspective view of a weight applicator for a wheel in accordance with an exemplary embodiment of the invention.
Figure 5A:
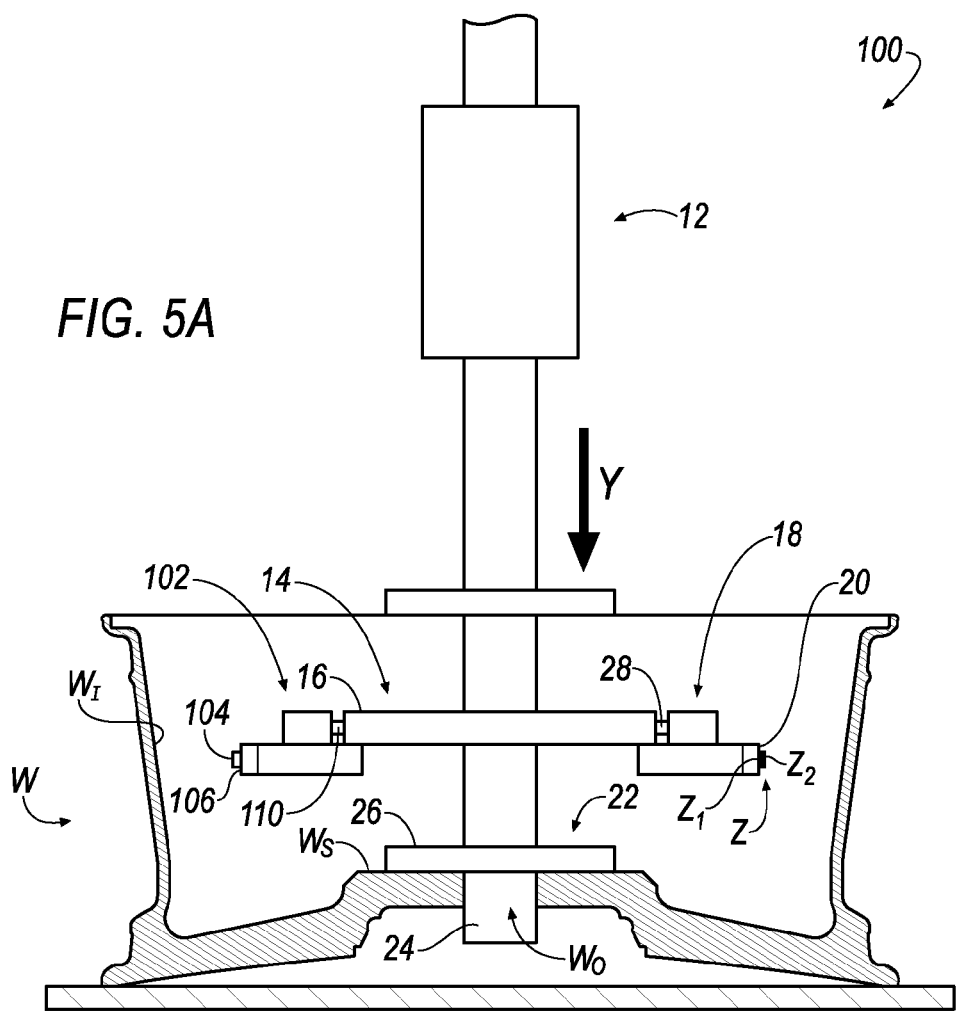

Referring to FIG. 4, a weight applicator 100 is shown in accordance with an embodiment of the invention. In embodiment, the weight applicator 100 is substantially similar to the weight applicator 10, having an applicator portion 14. However, the weight applicator 100 not only includes the plunger portion 18 (hereinafter referred to as the "first plunger portion"), but, the weight applicator 100 also includes a second plunger portion 102. In an embodiment, the second plunger portion 102 is connected to flange portion 16 and is arranged in a substantially diametric relationship to that of the first plunger portion 18 to define the applicator portion 14.

In an embodiment, as seen at FIGS. 5A-6B, the second plunger portion 102 is substantially similar to the first plunger portion 18 in structure and function with the exception that the second plunger portion 102 does not function in a manner by carrying the weight, Z, and subsequently applying the weight, Z, to the inner surface, $W_I$, of the wheel, W, as described above in FIGS. 2A-3C. Rather, the second plunger portion 102 includes a wheel engagement portion 104 attached to and extending radially away from the arcuate outer surface 106 of the second plunger portion 102. In an embodiment, the arm 12 may be pivoted according to the direction of the arrow, P (see, e.g., FIGS. 5B and 6B), and, subsequently, the second plunger portion 102 may be moved radially outwardly according to the direction of the arrow, X, as similarly described above such that the wheel engagement portion 104 may perform one or more functions.

In an embodiment, the wheel engagement portion 104 may be extended radially outwardly away from the flange portion 16 according to the direction of the arrow, X, to function in a manner that, for example, cleans, wipes or vacuums dirt, dust or debris away from a portion of the inner surface, $W_I$, of the wheel, W. In an embodiment, by cleaning, wiping or vacuuming away dirt, dust or debris away from a portion of the inner surface, $W_I$, of the wheel, W, the second surface, $Z_2$, of the weight, Z, may be later attached to the inner surface, $W_I$, of the wheel, W, without any interference from the dust, dirt or debris that may otherwise compromise the adhesive bond of the weight, Z, and the inner surface, $W_I$, of the wheel, W.

In an alternative embodiment, the wheel engagement portion 104 may be extended radially outward away from the flange portion 16 according to the direction of the arrow, X, to function in a manner, for example, that applies an adhesive to a portion of the inner surface, $W_I$, of the wheel, W, where the weight is to be applied. Accordingly, if, for example, the second surface, $Z_2$, of the weight, Z, does not include adhesive, the wheel engagement portion 104 may prepare the inner surface, $W_I$, of the wheel, W, with an adhesive in order to adhesively bond the weight, Z, to the wheel, W. Alternatively, if, for example, the second surface, $Z_2$, of the weight, Z, already includes adhesive, the wheel engagement portion 104 may prepare the inner surface, $W_I$, of the wheel, W, with an adhesive in order to supplement the adhesive bond of the weight, Z, and the wheel, W.

Figures 5B, 6B:
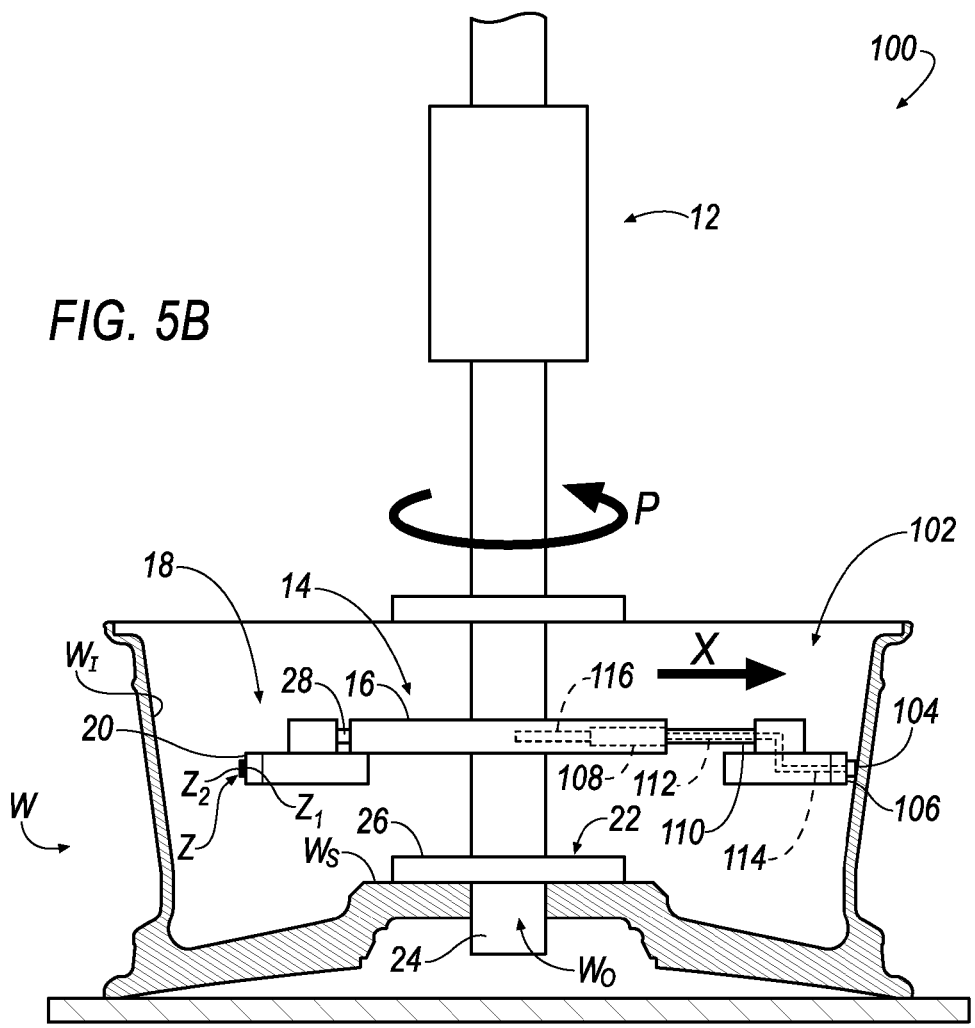

In an embodiment, as seen in FIG. 5B, if the wheel engagement portion 104 functions as an adhesive applicator as described above, the flange portion 16, for example, may further define a liquid adhesive reservoir, which is shown generally at 108. It will be appreciated that, if, for example, the wheel engagement portion 104 functions in a manner that cleans the inner surface, $W_I$, of the wheel, W, the reservoir 108 may function as a stowage compartment for the removed dirt, dust or debris.

Further, in an embodiment, it will be appreciated that the one or more arms 110 that movably-connect the second plunger portion 102 to the flange portion 16 may be hollowed to define a fluid flow channel 112 that communicates the adhesive from the reservoir 108 toward the wheel engagement portion 104. Further, the second plunger portion 102 may also define a fluid flow channel 114 that connects the fluid flow channel 112 of the one or more arms 110 to the wheel engagement portion 104.

In an embodiment, to communicate the adhesive from the reservoir 108 and fluid flow channels 112, 114 to the wheel engagement portion 104, the weight applicator 100 may further comprise a pump 116 that is connected to a controller (not shown). Further, in an embodiment, the wheel engagement portion 104 may further define a substantially porous material, such as, for example, a sponge, that permits the adhesive to be wicked upon the inner surface, $W_I$, of the wheel, W. Although the wheel engagement portion 104 is described to include functions of removing dust, dirt, or debris or applying an adhesive, it will be appreciated that the wheel engagement portion 104 is not limited to a single particular function and that the wheel engagement portion 104 may perform one or more functions such as, for example, the functions described above.

Figure 6A:
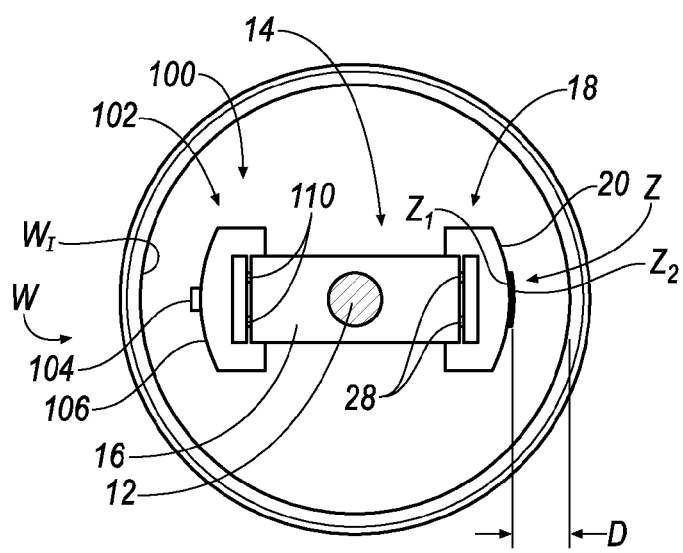

Once the wheel engagement portion 104 has worked on the inner surface, $W_I$, of the wheel, W, as described above, the wheel engagement portion 104 may be radially withdrawn away from the inner surface, $W_I$, of the wheel, W, in direction substantially opposite the direction of the arrow, X. Referring to FIGS. 5C, 6C, the arm 12 may be pivoted approximately 180° in order to locate the first plunger portion 18 proximate the portion of the inner surface, $W_I$, of the wheel, W, where the second plunger portion 104 worked upon the inner surface, $W_I$, of the wheel, W.

Figures 5D, 6D:
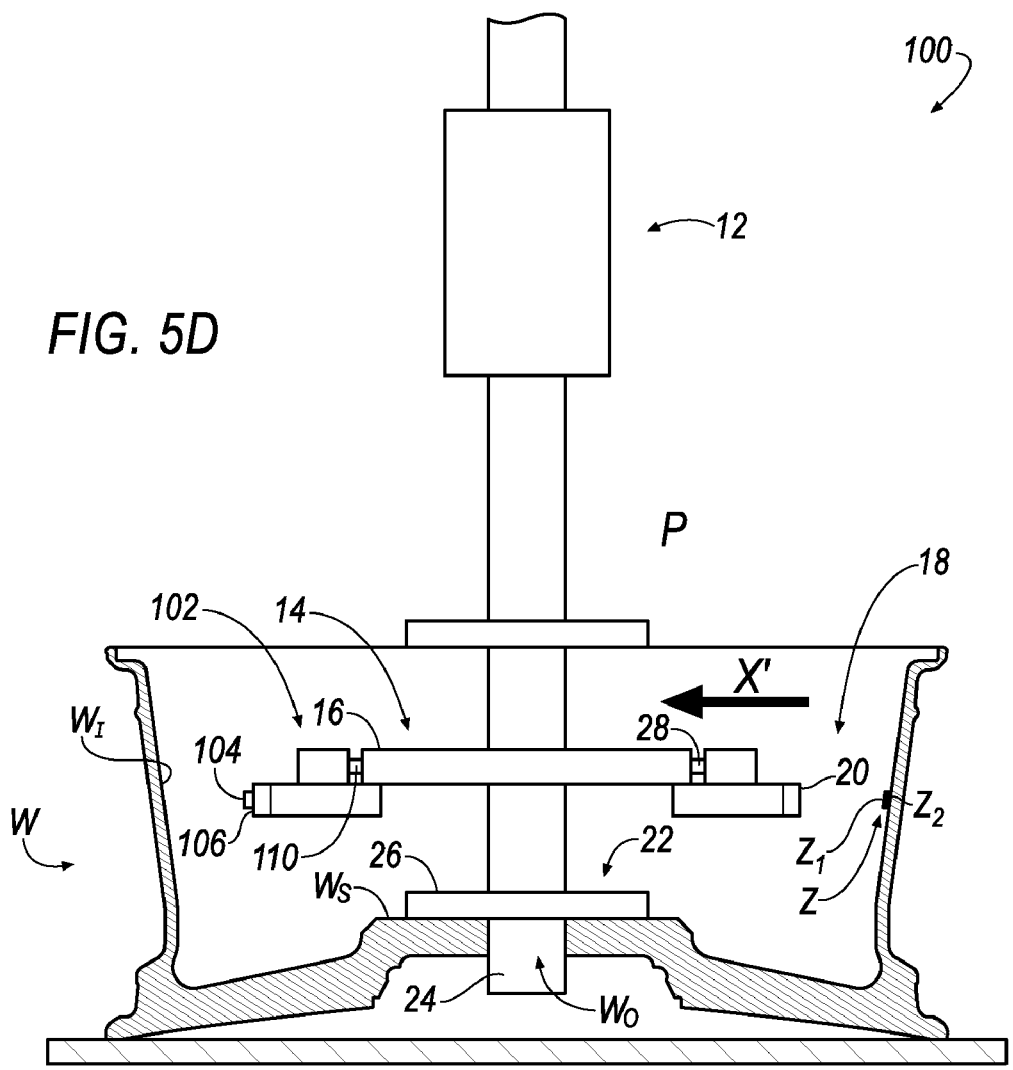

Then, the first plunger portion 18 may be radially extended according to the direction of the arrow, X, in order to affix the weight, Z, to the inner surface, $W_I$, of the wheel, W. Referring to FIGS. 5D, 6D, the first plunger portion 18 may then be radially withdrawn according to the direction of the arrow, X', which is substantially opposite the direction of the arrow, X, such that the first surface, $Z_1$, of the weight, Z, is detached from the outer arcuate surface 20 of the plunger portion 18 in order to affix the weight, Z, to the inner surface, $W_I$, of the wheel, W.

Figure 7:
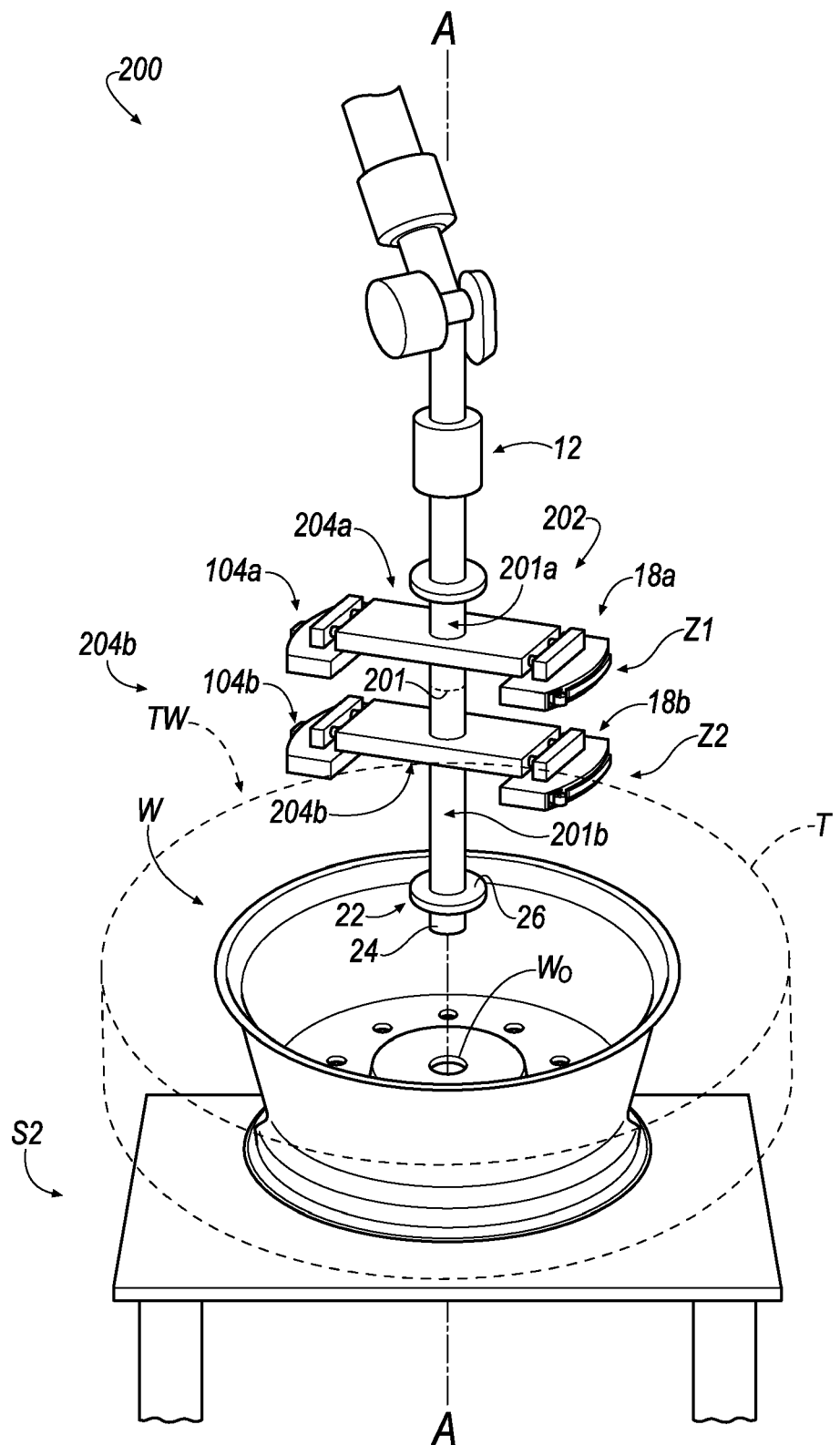
FIG. 7 illustrates a perspective view of a weight applicator for a wheel in accordance with an exemplary embodiment of the invention.
Figure 8:
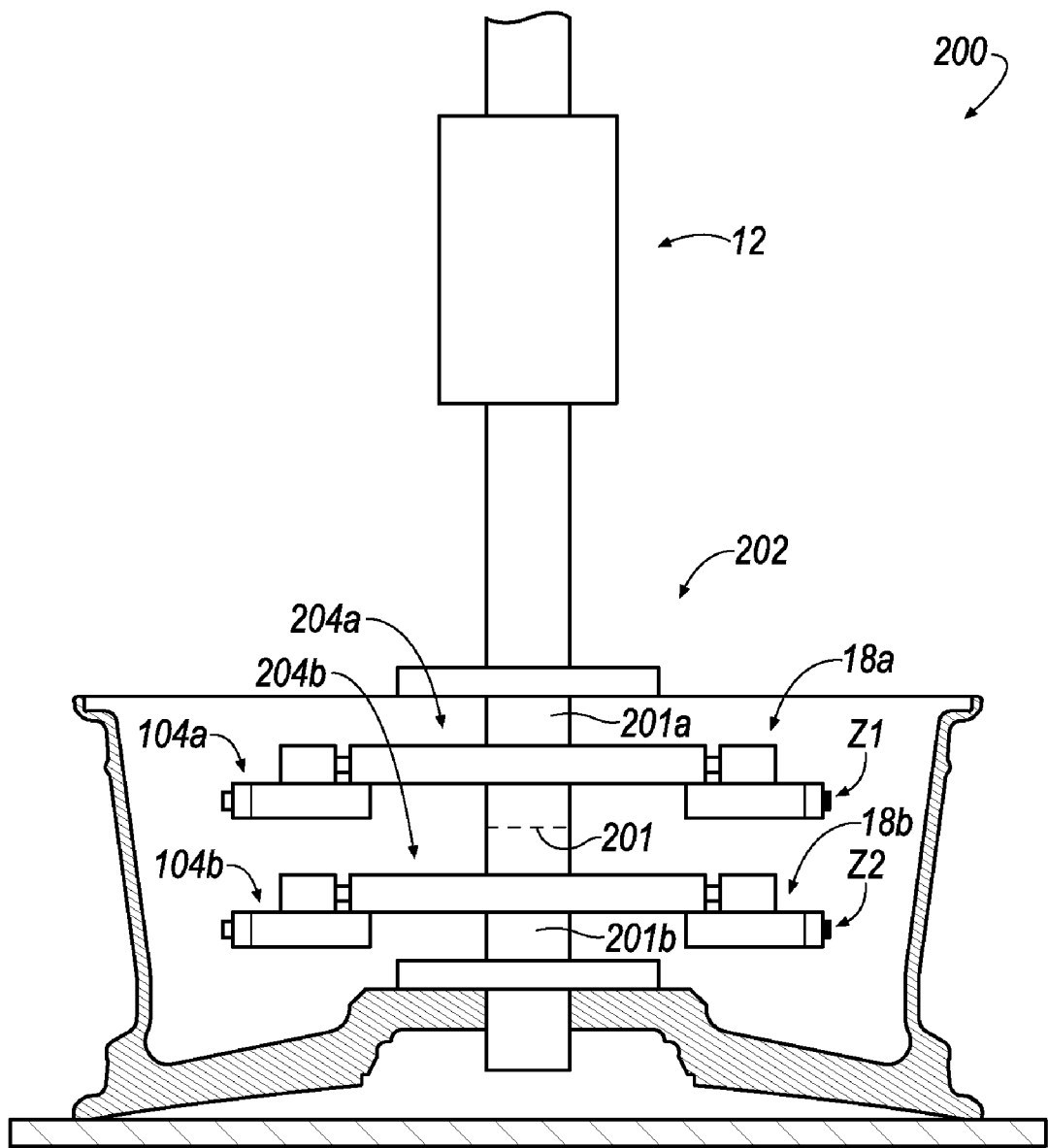
FIG. 8 illustrates a side, cross-sectional view of a wheel and a side view of the weight applicator of FIG. 7 in accordance with an exemplary embodiment of the invention.

Referring to FIGS. 7-8, a weight applicator 200 is shown in accordance with an embodiment of the invention. In embodiment, the weight applicator 200 is substantially similar to the weight applicator 100. However, the weight applicator 200 includes a pair of applicator portions 202, which are shown generally at 204a, 204b, rather than a single applicator portion, which is shown generally at 14. Each of the first and second applicator portions 204a, 204b include first and second plunger portions 18a, 18b and 104a, 104b.

As illustrated, a first applicator portion 204a of the pair of applicator portions 202 is axially spaced away from a second applicator portion 204b of the pair of applicator portions 202. In an embodiment, the arm 12 may include, for example, a single, unitary axial segment that pivots both of the first and second applicator portion 204a, 204b in unison. However, it will be appreciated that the arm 12 may be segmented at a seam 201, such that the arm 12 may include two or more axial segments 201a, 201b.

In an embodiment, the first applicator portion 204a may be attached to a first axial segment 201a of the arm 12 as the second applicator portion 204b is attached to a second axial segment 201b of the arm 12. Accordingly, by attaching each of the first and second applicator portions 204a, 204b to separate axial segments 201a, 201b of the arm 12, it will be appreciated that the first and second applicator portions 204a, 204b may be pivoted independently of one another and not, for example, in unison.

In an embodiment, the first plunger portions are shown generally at 18a, 18b, and, the second plunger portions are shown generally at 104a, 104b. The first plunger portions 18a, 18b and the second plunger portions 104a, 104b function substantially similar as that described above such that at least a first weight, Z1, and a second weight, Z2, are attached to the inner surface, $W_I$, of the wheel, W, in an axially-spaced relationship according to the axial spacing of the first and second applicator portions 204a, 204b.

Referring now to FIGS. 9A-9F, the weight applicator 200 is described in accordance with an embodiment of the invention. In an embodiment, each of the first plunger portions 18a, 18b may be further characterized by a cavity 206 that extends from the arcuate outer surface 20 toward a rear surface 30 of each of the first plunger portions 18a, 18b. In an embodiment, a biased pressure applicator 208 may be disposed within and connected to the cavity 206.

In an embodiment, the biased pressure applicator 208 may include a spring member 210 having a first end 212 affixed to a rear wall 214 of the cavity 206. Further, the biased pressure applicator 208 may include a head, roller or the like, which is shown generally at 216, that is affixed to a second end 218 of the spring member 210.

Figure 9A:
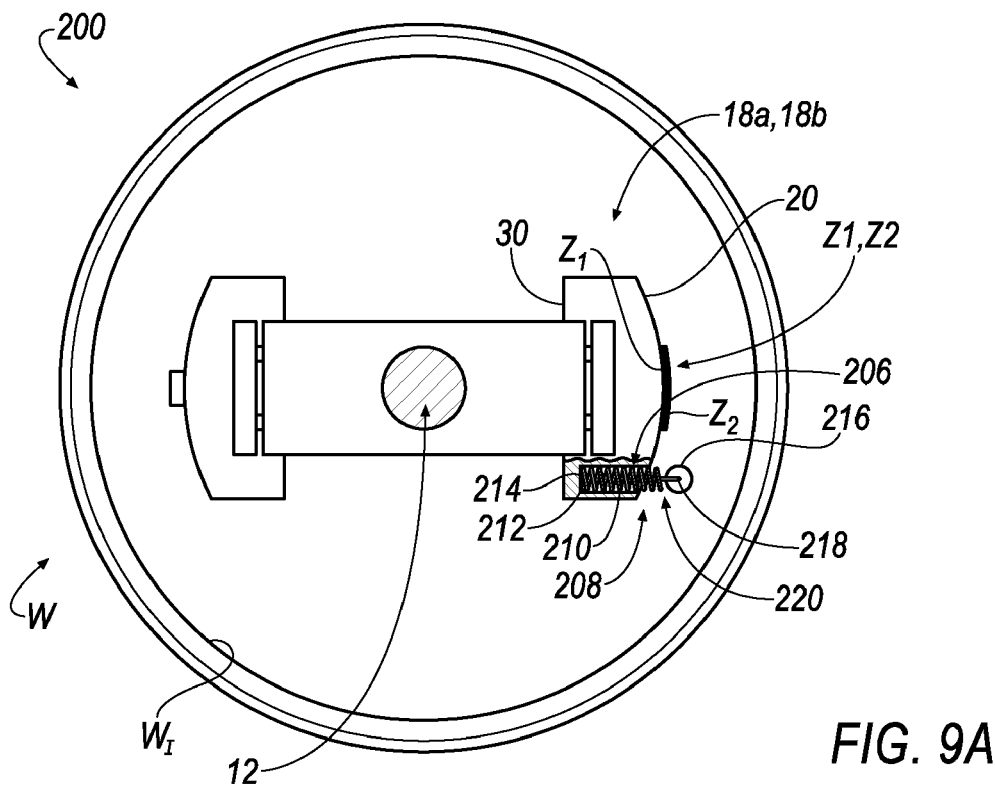
FIGS. 9A-9F illustrate a top view of a wheel and a top, partial cross-sectional view of the weight applicator of FIG. 7 in accordance with an exemplary embodiment of the invention.
Figure 9B:
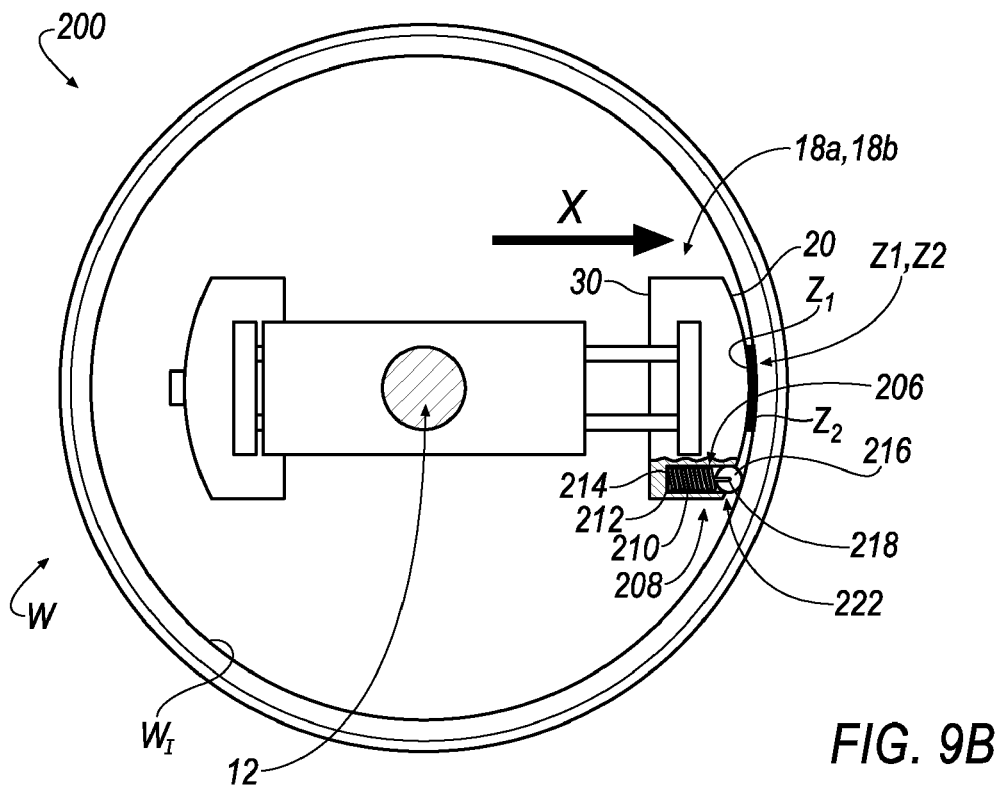

In an embodiment, as seen in FIG. 9A, prior to moving one or more of the first plunger portions 18a, 18b in the direction of the arrow, X, the spring member 210 is biased to an extended state such that a portion 220 of the spring member 210 proximate the second end 218 that is attached to the roller 216 extends past the arcuate outer surface 20. Then, as seen in FIG. 9B, upon moving the plunger portion 18a, 18b in the direction of the arrow, X, the roller 216 engages the inner surface, $W_I$, of the wheel, W, which results in the spring member 210 being compressed such that the portion 220 of the spring member 210 proximate the second end 218 is retracted within the cavity 206. It will be appreciated, however, that at least a portion 222 of the roller 216 extends past the arcuate outer surface 20 while in contact with the inner surface, $W_I$, of the wheel, W.

Figure 9C:
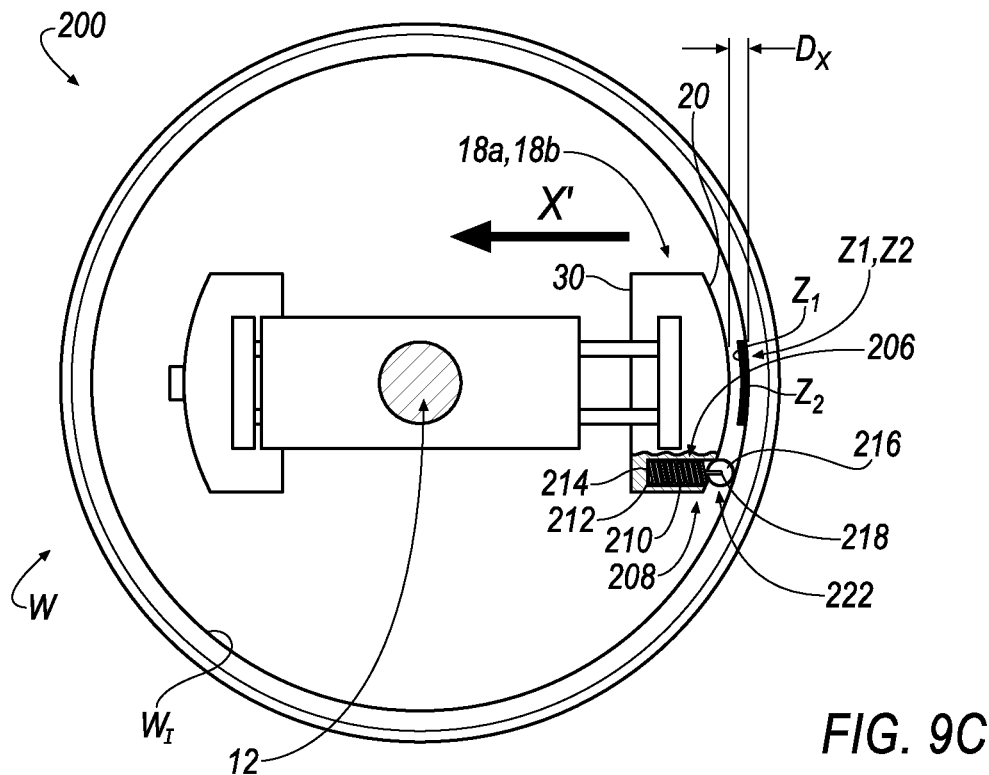

Referring to FIG. 9C, the first plunger portion 18a, 18b may be moved a relatively short distance, $D_X$, away from the inner surface, $W_I$, of the wheel, W, according to the direction of the arrow, X', such that the weight, Z1, Z2, is detached from the outer arcuate surface 20 of the plunger portion 18 in order to affix the weight, Z1, Z2, to the inner surface, $W_I$, of the wheel, W. As such, the bias of the spring member 210 results in the roller 216 being extended out of the cavity 206 as the roller 216 is in contact with the inner surface, $W_I$, of the wheel, W.

Figure 9D:
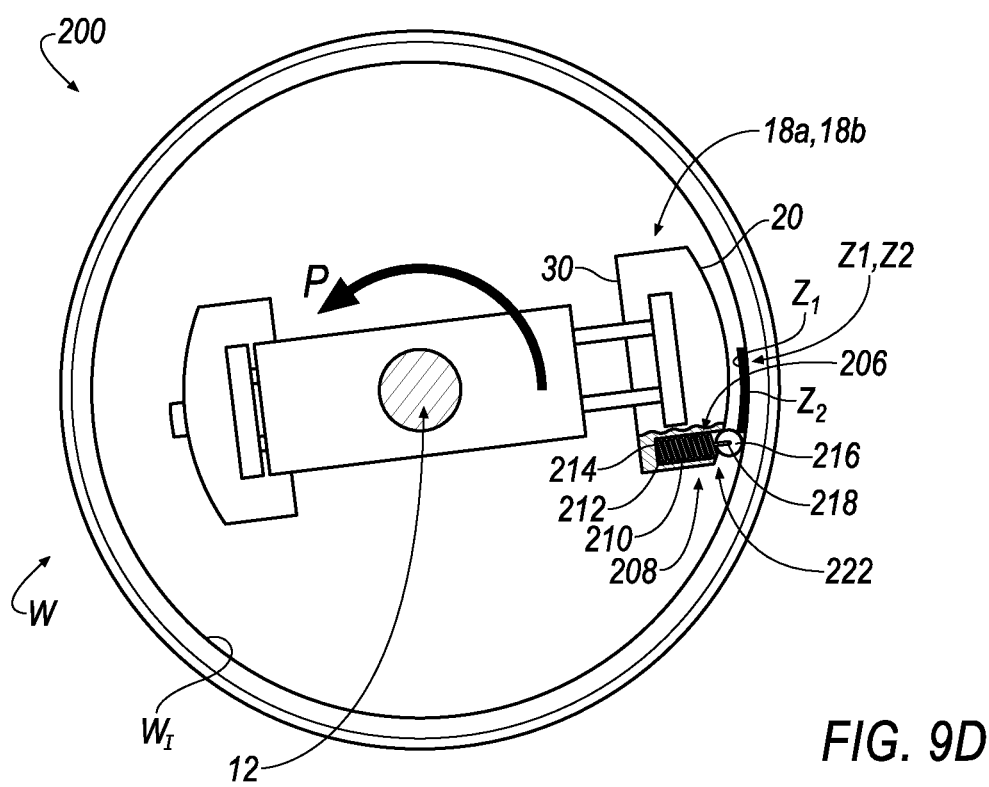

Referring to FIG. 9D, while maintaining the relatively short distance, $D_X$, between the arcuate outer surface 20 and the inner surface, $W_I$, of the wheel, W, the arm 12 is pivoted according to the direction of the arrow, P. When pivoted according to the direction of the arrow, P, the roller 216 comes into contact with one or more of the inner surface, $W_I$, of the wheel, W, and the first surface, $Z_1$, of the weight, Z1, Z2.

Figure 9E:
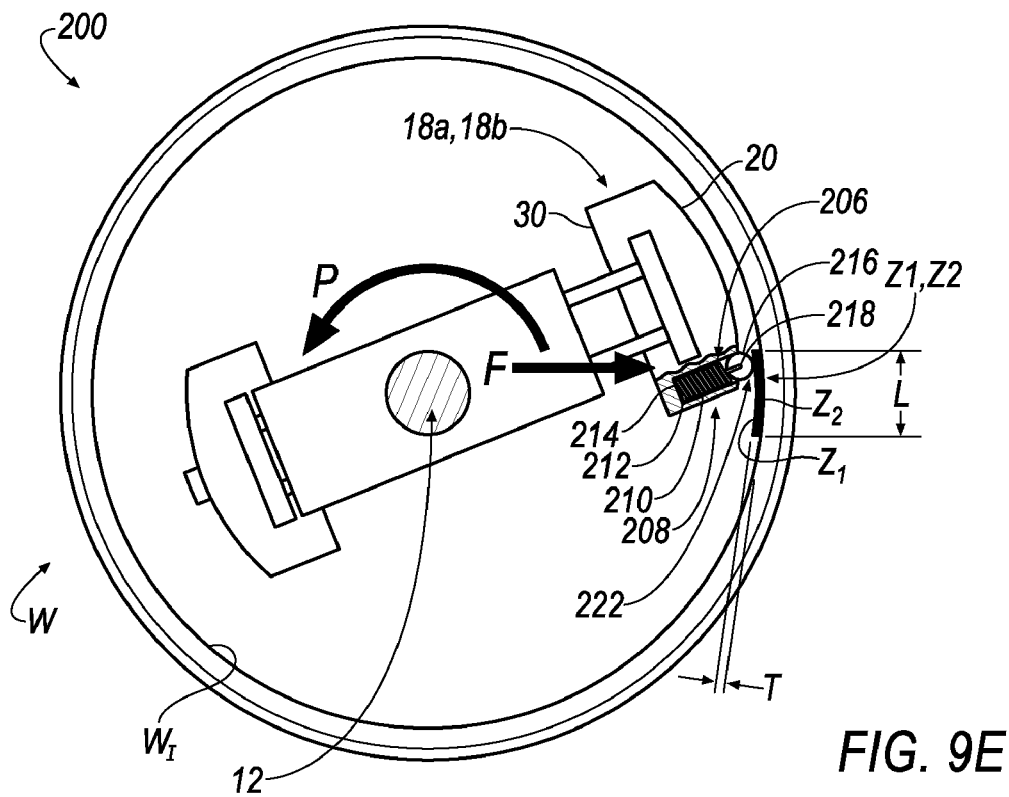

Referring to FIG. 9E, the arm 12 is further pivoted according to the direction of the arrow, P, such that the roller 216 no longer contact the inner surface, $W_I$, of the wheel, W, and is substantially in contact with the first surface, $Z_1$, of the weight, Z1, Z2. When arranged as shown in FIG. 9E, a thickness, T, of the weight, Z1, Z2, results in the roller 216 compressing the spring member 210 such that substantially only about the portion 222 of the roller 216 extends past the arcuate outer surface 20.

In an embodiment, it will be appreciated that when the arm 12 is pivoted according to the direction of the arrow, P, the bias of the spring member 210 results in the roller 216 applying a force to the first surface, $Z_1$, of the weight, Z1, Z2, according to the direction of the arrow, F. By applying the force, F, to the first surface, $Z_1$, of the weight, Z1, Z2, it will be appreciated that the roller 216 may reinforce the adhesive bond of the weight, Z1, Z2, to the inner surface, $W_f$, of the wheel, W. The reinforcement of the adhesive bond with the applied force, F, may repair the bond if, for example, the adhesive bond was compromised when the weight, Z1, Z2, was separated from the first plunger portion 18a, 18b when the first plunger portion 18a, 18b moved away from the inner surface, $W_f$, of the wheel, W, according to the direction of the arrow, X'.

Figure 9F:
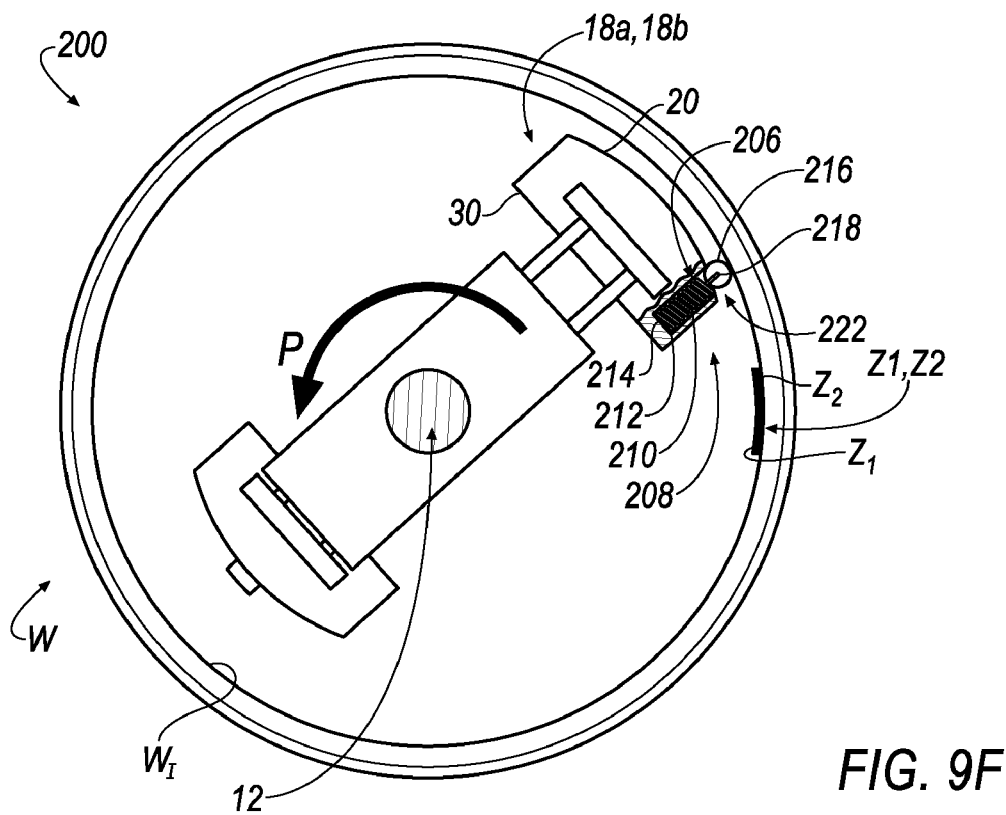

Referring to FIG. 9F, the arm 12 may be further rotated according to the direction of the arrow, P, such that the roller 216 is no longer in contact with the first surface, $Z_1$, of the weight, Z1, Z2. By pivoting the arm 12 according to the direction of the arrow, P, it will be appreciated that the arm 12 functionally 'sweeps' the roller 216 across substantially all of the first surface, $Z_1$, of the weight, Z1, Z2, in order to apply the force, F, to the entire arcuate length, L, of the weight, Z1, Z2.

Although the cavity 206 and biased pressure applicator 208 are shown and described in association with the weight applicator 200 having the pair of applicator portions 202, it will be appreciated that the invention is not limited to the illustrated embodiment. For example, it will be appreciated that either of the weight applicators 10, 100 may be designed to include the cavity 206 and biased pressure applicator 208 in conjunction with the first plunger portion 18.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. A weight applicator for a wheel of a tire-wheel assembly, comprising:
    an arm portion; an applicator portion connected to the arm portion, wherein the applicator includes a radially-extending flange portion, wherein the radially-extending flange portion is connected to the arm portion, and a first plunger portion movably-connected to the radially-extending flange portion by one or more first radial arms, wherein the first plunger portion includes an outer, substantially arcuate surface, wherein the first plunger portion defines a cavity; and a biased pressure applicator is connected to the first plunger portion and disposed within the cavity.

2. The weight applicator according to claim 1, wherein the one or more first radial arms permit the first plunger portion to be movably-connected to the radially-extending flange portion in a radial direction.

3. The weight applicator according to claim 1, wherein the outer, substantially arcuate surface permits the first plunger portion to be indirectly interfaced with a substantially arcuate inner surface of the wheel by way of an intervening, substantially arcuate weight that is removably-attached to the outer, substantially arcuate surface of the first plunger portion for depositing and attaching the substantially arcuate weight to the substantially arcuate inner surface of the wheel.

4. The weight applicator according to claim 1, wherein the biased pressure applicator includes: a head, and a spring member having a first end on a second end, wherein the first end is attached to a wall of the cavity, wherein the second end is attached to the head, wherein one or more of the second end and the head are adjustably-located proximate the outer, substantially arcuate surface of the first plunger portion, wherein at least a portion of the head is adjustably biased by the spring member past the outer, substantially arcuate surface of the first plunger portion.

5. The weight applicator according to claim 1, wherein the biased pressure applicator applies a biased, radially-outwardly-directed force toward an inner surface of the wheel for enhancing an adhesive connection of a weight to the inner surface of the wheel.

6. The weight applicator according to claim 1, wherein the arm portion includes a distal end having an interfacing portion including an axial portion and a radial portion, wherein the interfacing portion permits the arm portion to be axially-interfaced with a central opening of the wheel.

7. The weight applicator according to claim 1, wherein the applicator includes: a second plunger portion movably-connected to the radially-extending flange portion by one or more second radial arms.

8. The weight applicator according to claim 7, wherein the one or more second radial arms permit the second plunger portion to be movably-connected to the radially-extending flange portion in a radial direction.

9. The weight applicator according to claim 7, wherein the second plunger portion is diametrically arranged upon the radially-extending flange portion relative the first plunger portion.

10. A weight applicator for a wheel of a tire-wheel assembly, comprising:
    an arm portion; and an applicator portion connected to the arm portion, wherein the applicator includes a radially-extending flange portion, wherein the radially-extending flange portion is connected to the arm portion, and a first plunger portion movably-connected to the radially-extending flange portion by one or more first radial arms, wherein the applicator includes: a second plunger portion movably-connected to the radially-extending flange portion by one or more second radial arms that applies an adhesive to an inner surface of the wheel.

11. A weight applicator for a wheel of a tire-wheel assembly, comprising:
    an arm portion; and an applicator portion connected to the arm portion, wherein the applicator includes a radially-extending flange portion, wherein the radially-extending flange portion is connected to the arm portion, and a first plunger portion movably-connected to the radially-extending flange portion by one or more first radial arms, wherein the applicator includes a second plunger portion movably-connected to the radially-extending flange portion by one or more second radial arms that removes debris from an inner surface of the wheel.

12. A weight applicator for a wheel of a tire-wheel assembly, comprising:
an arm portion; and a plurality of applicator portions connected to the arm portion, wherein each applicator portion of the plurality of applicator portions includes a radially-extending flange portion, wherein the radially-extending flange portion is connected to the arm portion, and one or more plunger portions movably-connected to the radially-extending flange portion by one or more radial arms, wherein the arm portion includes a first axial segment and a second axial segment demarcated by a seam, wherein the plurality of applicator portions includes a first applicator portion and a second applicator portion, wherein the first applicator portion is connected to the first axial segment, wherein the second applicator portion is connected to the second axial segment.

13. The weight applicator according to claim 12, wherein demarcation of the first axial segment and the second axial segment at the seam permits independent rotation of one or more of the first applicator portion and the second applicator portion, wherein the independent rotation of one or more of the first applicator portion and the second applicator portion is conducted relative the other of the first applicator portion and the second applicator portion.

14. The weight applicator according to claim 12, wherein the one or more plunger portions includes: a first plunger portion, and a second plunger portion.

15. The weight applicator according to claim 14, wherein the second plunger portion is diametrically arranged upon the radially-extending flange portion relative the first plunger portion.

16. A weight applicator for a wheel of a tire-wheel assembly, comprising:
an arm portion; and a plurality of applicator portions connected to the arm portion, wherein each applicator portion of the plurality of applicator portions includes a radially-extending flange portion, wherein the radially-extending flange portion is connected to the arm portion and one or more plunger portions movably-connected to the radially-extending flange portion by one or more radial arms, wherein the one or more plunger portions includes a first plunger portion and a second plunger portion, wherein the first plunger portion deposits and attaches a weight to an inner surface of the wheel, wherein the second plunger portion applies an adhesive to an inner surface of the wheel prior to the depositing and attaching of the weight to the inner surface of the wheel and removes debris from an inner surface of the wheel prior to the depositing and attaching of the weight to the inner surface of the wheel.

17. A method for processing a wheel of a tire-wheel assembly, comprising the steps of:
providing one or more radially-directed plunger portions that are connected to an arm portion;
axially-moving the arm portion for positioning the one or more radially-directed plunger portions proximate a wheel;
pivoting one or more of the arm portion and the one or more radially-directed plunger portions for positioning the one or more radially-directed plunger portions proximate a portion of an inner surface of the wheel;
radially-extending the one or more radially-directed plunger portions away from the arm portion for engaging the portion of the inner surface of the wheel; and
utilizing a first plunger portion of the one or more radially-directed plunger portions for removing dust, dirt or debris from the inner surface of the wheel prior to radially-extending a second plunger portion of the one or more radially-directed plunger portions away from the arm portion for engaging the portion of the inner surface of the wheel.

18. A method for processing a wheel of a tire-wheel assembly, comprising the steps of:
providing one or more radiall-directed plunger portions that are connected to an arm portion;
axially-moving the arm portion for positioning the one or more radially-directed plunger portions proximate a wheel;
pivoting one or more of the arm portion and the one or more radiall-directed plunger portions for positioning the one or more radially-directed plunger portions proximate a portion of an inner surface of the wheel;
radially-extending the one or more radially-directed plunger portions away from the arm portion for engaging the portion of the inner surface of the wheel; and
utilizing a first plunger portion of the one or more radially-directed plunger portions for applying an adhesive to the inner surface of the wheel prior to radially-extending a second plunger portion of the one or more radially-directed plunger portions away from the arm portion for engaging the portion of the inner surface of the wheel.

19. A method for processing a wheel of a tire-wheel assembly, comprising the steps of:
providing one or more radially-directed plunger portions that are connected to an arm portion;
axially-moving the arm portion for positioning the one or more radially-directed plunger portions proximate a wheel;
pivoting one or more of the arm portion and the one or more radially-directed plunger portions for positioning the one or more radially-directed plunger portions proximate a portion of an inner surface of the wheel;
radially-extending the one or more radially-directed plunger portions away from the arm portion for engaging the portion of the inner surface of the wheel; and
forming a cavity in at least one of the one or more radially-directed plunger portions; and
arranging a biased pressure applicator within the cavity.

20. The method according to claim 19, further comprising the steps of:
arranging the biased pressure applicator to include a head and a spring member having a first end on a second end, wherein the first end is attached to a wall of the cavity, wherein the second end is attached to the head, wherein one or more of the second end and the head are adjustably-located proximate an outer, substantially arcuate surface of a first plunger portion of the one or more radially-directed plunger portions; and
adjustably-biasing at least a portion of the head past the outer, substantially arcuate surface of the first plunger portion.

21. A method for processing a wheel of a tire-wheel assembly, comprising the steps of:
- providing one or more radially-directed plunger portions that are connected to an arm portion;
- axially-moving the arm portion for positioning the one or more radially-directed plunger portions proximate a wheel;
- pivoting one or more of the arm portion and the one or more radially-directed plunger portions for positioning the one or more radially-directed plunger portions proximate a portion of an inner surface of the wheel;
- radially-extending the one or more radially-directed plunger portions away from the arm portion for engaging the portion of the inner surface of the wheel; and
- arranging the arm portion to include a first axial segment and a second axial segment demarcated by a seam, wherein the one or more radially-directed plunger portions includes a first applicator portion and a second applicator portion, wherein the first applicator portion is connected to the first axial segment, wherein the second applicator portion is connected to the second axial segment.

22. The method according to claim 21, further comprising the step of:
- permitting independent rotation of one or more of the first applicator portion and the second applicator portion, wherein the independent rotation of one or more of the first applicator portion and the second applicator portion is conducted relative the other of the first applicator portion and the second applicator portion.

* * * * *